United States Patent Office 3,513,179
Patented May 19, 1970

3,513,179
CYANO SUBSTITUTED ESTRIOL DERIVATIVES
Eugene E. Galantay, Morristown, N.J., assignor to Sandoz-Wander, Inc., Hanover, N.J., a corporation of Delaware
No Drawing. Filed Feb. 29, 1968, Ser. No. 709,181
Int. Cl. C07c *169/08*
U.S. Cl. 260—397.5                                5 Claims

ABSTRACT OF THE DISCLOSURE

The compounds are cyano substituted estriol derivatives. They are prepared by treating a suitable 16α-substituted estrone with an alkyl aluminum cyanide and hydrolyzing the reaction product to obtain the corresponding cyano substituted estriol. The compounds have estrogenic/progestational activity.

---

This invention relates to cyano-estriols. In one particular aspect it relates to 17α-cyano-3,16α-diacetoxyestra-1,3,5(10) - trien - 17β-ol and 17β-cyano-3,16α-diacetoxyestra-1,3,5(10)-trien-17α-ol and processes for the preparation thereof.

The cyano-estriols of this invention may be represented by the formula

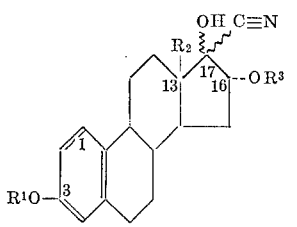

(I)

wherein $R^1$ and $R^3$ independently are hydrogen, lower alkyl having 1 to 3 carbon atoms, cycloalkyl, lower acyl, tetrahydropyranyl or tetrahydrofuranyl; and
$R^2$ is alkyl having 1 to 3 carbon atoms.

The preferred compound of this invention are 17α-cyano-3,16α-diacetoxyestra-1,3,5(10)-trien-17β-ol

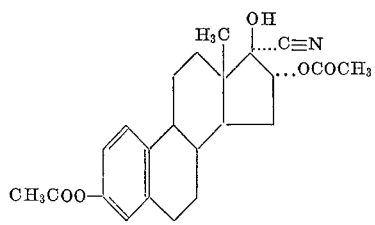

and 17β - cyano - 3,16α - diacetoxyestra-1,3,5(10)-trien-17α-ol

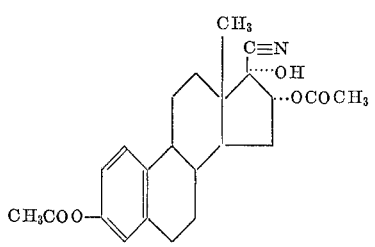

(Ib)

The process for preparing the compounds of Formula I may be represented by the following reaction scheme:

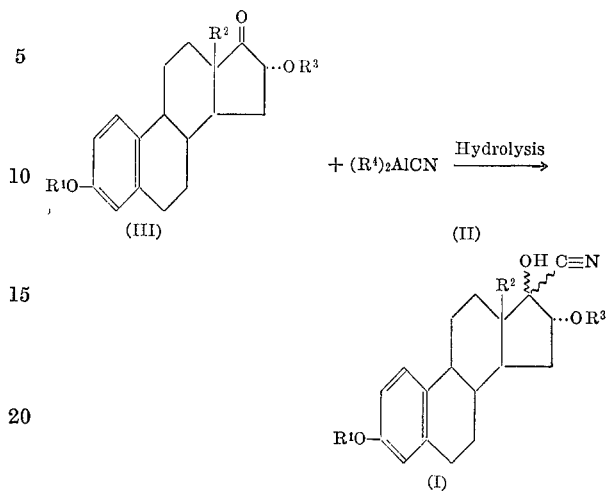

wherein $R^1$, $R^2$, and $R^3$ have the above significance and $R^4$ is a lower alkyl having 1 to 3 carbon atoms.

Compounds (I) are prepared by treating a 16α-substituted estrone (III), wherein $R^1$ and $R^2$ have the above stated significance, with an alkyl aluminum cyanide in a solvent, and subjecting the reaction mixture to hydrolysis, preferably with an aqueous solution of an acid such as acetic or a salt such as ammonium chloride. The solvent may be an aromatic hydrocarbon such as benzene, toluene, xylene and the like. Solvents such as tetrahydrofuran may also be used. The reaction may be carried out at a temperature of —60° to 40° C. and preferably at a temperature of —20° to 0° C.

Where the starting material of Formula III is 3,16α-diacetoxyestra-1,3,5(10)-trien-17-one

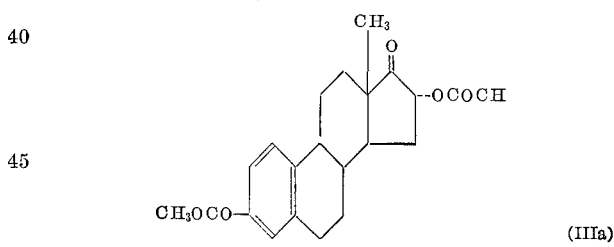

(IIIa)

17α-cyano-3,16α-diacetoxyestra - 1,3,5(10) - trien - 17β-ol (Ia) and 17β-cyano-3,16α-diacetoxyestra-1,3,5(10) - trien-17α-ol (Ib) are obtained. Conventional recovery techniques are utilized for obtaining the products (Ia) and (Ib).

Certain of the compounds of Formula II and Formula III are known and are prepared by methods disclosed in the literature. Those compounds of Formula II and Formula III not specifically disclosed are prepared according to analogous methods from known materials.

The estriol derivatives represented by Formula I above are useful because they posses pharmacological properties in animals. In particular, such compounds are useful in the treatment of the (post) menopausal syndrome as indicated by the estrogenic activity of compound (Ia) in the mouse given a dose of 1 microgram per day for three days of active agent and in the rat given a dose of 1 microgram per day for two days of active agent.

Compound (Ib) exhibited estrogenic activity in the mouse given a total dose of 10 micrograms per day for three days of active agent and in the rat given a daily dose of 10 micrograms per day for two days of active agent. The test methods used are basically as described in Endocrinology 65 (1959) 265 (for the mouse) and Am. J. Physiol. 189 (1957) 355 (for the rat).

The compounds (I) may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.1 milligram to 2 milligrams. This daily dosage is preferably given in equally divided doses, e.g., 1 to 2 times a day, or in sustained release form. It will be appreciated by those skilled in the art, that the daily dosage level is independent of body weight. Dosage forms suitable for internal administration comprise from about 0.05 milligram to about 2 milligrams of the compound in admixture with a solid or liquid pharmaceutical carrier or diluent.

A representative formulation suitable for oral administration is a tablet prepared by standard tabletting techniques which contains the following:

Ingredient: Parts by weight

17α - cyano - 3,16α - diacetoxyestra-1,3,5(10)-trien-17β-ol _____ 0.5
Tragacanth _____ 2
Lactose _____ 89
Corn starch _____ 5
Talcum _____ 3
Magnesium stearate _____ 0.5

This invention is illustrated but not limited by the following example.

EXAMPLE

17α-cyano-3,16α-diacetoxyestra-1,3,5(10)-trien-17β-ol

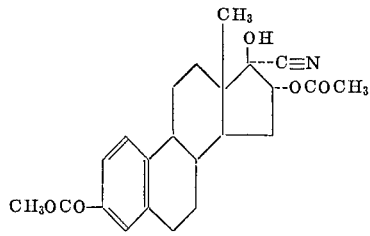

and

17β-cyano-3,16α-diacetoxyestra-1,3,5(10)-trien-17α-ol

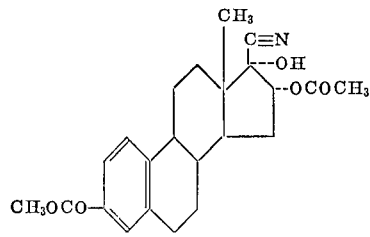

Step I.—A solution of 1.4 g. of 3,16α-diacetoxyestra-1,3,5(10)-trien-17-one in 75 ml. of toluene was added at −25° C., to a solution of 3.2 g. of diethylaluminum cyanide in 75 ml. of toluene. After one hour at −25° C., 80 ml. of 3 N aqueous acetic acid was added. The mixture was filtered and the toluene phase separated. The toluene phase was washed three times with 10 ml. of 3 N acetic acid, three times with water and then dried with magnesium sulfate. The toluene was evaporated leaving a mixture of the two compounds described above. The mixture was dissolved in 5 ml. of benzene from which the 17α-cyano-3,16α-diacetoxyestra-1,3,5(10)trien-17β-ol was crystallized; M.P. 205°–215° C., $[\alpha]^D = 16.0$ (c.=1, CHCl$_3$).

Step II.—The benzene mother liquor for the crystallization of Step I was evaporated and the resulting material applied to silica gel H plates and chromatographed in chloroform. The band having an $R_f$ value of 0.45 was eluted with ethyl acetate and the eluate crystallized from methanol to give 17β-cyano-3,16α-diacetoxyestra-1,3,5(10)-trien-17α-ol; M.P. 183–189° C. $[\alpha]^D = +104°$ (c.=1, CHCl$_3$).

When the procedure according to Step I is utilized and 3-hydroxy-16α-methoxyestra-1,3,5(10)trien-17-one, 3-hydroxy-16α-cyclopropyloxy-1,3,5(10)trien-17-one or 3-(2-tetrahydropyranyloy) - 16α - (2 - tetrahydrofuryloxy)-1,3,5(10)-trien-17-one are used as the starting material in place of 3,16α-diacetoxyestra-1,3,5(10-trien-17-one, 17α - cyano-3-hydroxy-16α-methoxyestra-1,3,5(10)-trien-17β - ol, 17α-cyano-3-hydroxy-16α-cyclopropyloxyestra-1,3,5(10) - trien-17β-ol, or 17α-cyano-3(2-tetrahydropyranyloxy) - 16α(2 - tetrahydrofuryloxy-estra-1,3,5(10)-trien-17β-ol, respectively, is obtained.

What is claimed is:

1. A compound of the formula

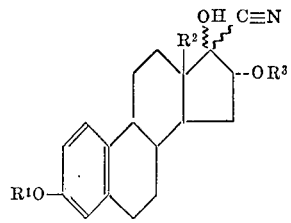

wherein

R$^1$ and R$^3$ independently are hydrogen, lower alkyl, lower acyl, tetrahydropyranyl or tetrahydrofuranyl; and R$^2$ is lower alkyl having 1 to 3 carbon atoms.

2. The compound of claim 1 which is 17α-cyano-3,16α-diacetoxyestra-1,3,5(10)-trien-17β-ol.

3. The compound of claim 1 which is 17β-cyano-3,16α-diacetoxyestra-1,3,5(10)-trien-17α-ol.

4. A process for preparing a compound of claim 1 which comprises treating in an aromatic hydrocarbon solvent a compound of the formula

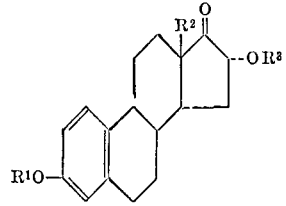

wherein

R$^1$ and R$^3$ independently are hydrogen, lower alkyl, lower acyl, tetrahydropyranyl or tetrahydrofuranyl; and R$^2$ is alkyl having 1 to 3 carbon atoms, with an alkyl aluminum cyanide, said alkyl having 1 to 6 carbon atoms, and subjecting the reaction mixture to hydrolysis.

5. A process for the preparation of the compounds 17α-cyano - 3,16α - diacetoxyestra-1,3,5(10)-trien-17β-ol and 17β-cyano-3,16α-diacetoxyestra-1,3,5(10)-trien - 17α - ol which comprises treating 3,16α-diacetoxyestra-1,3,5(10)-trien-17-one with diethylaluminum cyanide and subjecting the reaction mixture to hydrolysis to obtain said compounds.

References Cited

UNITED STATES PATENTS 2,742,485   4/1956   Ercoli et al.
3,043,833   7/1962   De Ruggieri.

HENRY A. FRENCH, Primary Examiner

U.S. Cl. X.R.
260—239.55, 999